United States Patent [19]

DiMauro et al.

[11] 4,244,554
[45] Jan. 13, 1981

[54] SPRINGLESS DIAPHRAGM VALVE

[75] Inventors: Joseph DiMauro, Hillside; Herbert H. Kaemmer; Noel A. Otto, both of Whippany; Roger G. Riefler, Kinnelon, all of N.J.

[73] Assignee: Automatic Switch Company, Florham Park, N.J.

[21] Appl. No.: 26,119

[22] Filed: Apr. 2, 1979

Related U.S. Application Data

[63] Continuation of Ser. No. 600,541, Jul. 31, 1975, abandoned.

[51] Int. Cl.³ .......................................... F16K 31/126
[52] U.S. Cl. .................................... 251/61.1; 251/30; 251/45; 92/94
[58] Field of Search ........................ 92/98 R, 99, 94; 251/61, 61.1, 61.2, 30, 45

[56] References Cited

U.S. PATENT DOCUMENTS

| 2,208,149 | 7/1940 | Vernet | 92/94 |
| 2,305,151 | 12/1942 | Fields | 251/30 |
| 2,635,635 | 4/1953 | Eimermann | 251/30 |
| 3,038,488 | 6/1962 | Welch et al. | 251/61 |
| 3,090,592 | 5/1963 | Fleer | 251/30 |
| 3,379,406 | 4/1968 | Greer | 251/45 |

Primary Examiner—Martin P. Schwadron
Assistant Examiner—G. L. Walton
Attorney, Agent, or Firm—Alan H. Levine

[57] ABSTRACT

A valve having a flexible diaphragm for opening and closing the valve. The diaphragm is biased into valve-closing position by a ridge, formed in the valve body, which presses the diaphragm toward the valve seat. A rigid backup washer is secured to the diaphragm solely by an elastomeric type adhesive. A bleed hole in the diaphragm establishes communication between the valve inlet port and a chamber on the side of the diaphragm opposite the valve seat. The bleed hole is in the margin of the diaphragm which is sandwiched between two portions of the valve body.

9 Claims, 5 Drawing Figures

SPRINGLESS DIAPHRAGM VALVE

This application is a continuation of application Ser. No. 600,541 filed July 31, 1975 now abandoned.

This invention relates to valves, and more particularly to a valve of the type in which a flexible diaphragm within the valve controls the flow of fluid through the valve.

The invention is especially concerned with providing a very fast operating valve capable of producing a short duration, maximum flow pulse. Ideally, the opening time and closing time for such a valve approaches zero, so that the pulse produced comes as close to a square wave as possible. Valves of this type are particularly suited for use in dust collecting equipment wherein the filter bags, or other elements on which the dust is collected must be shaken or jarred periodically to remove the collected dust from them, the dust usually falling into a collection hopper. The quicker such a valve opens, the greater is the jarring effect produced by the fluid pulse leaving the valve for any particular fluid pressure applied to the valve. Furthermore, since a number of such valves are often operated in sequence and supplied with fluid from a single fluid pressure source, the quicker such a valve closes, the less the supply source is taxed and the sooner the next valve in the series can be operated.

It is an object of the present invention to provide a diaphragm valve which opens and closes very rapidly in response to control signals, so as to produce a high volume, short duration fluid pulse.

It is an additional object of the invention to provide such a valve having a very light weight diaphragm assembly capable of rapid response to control signals.

It is another object of the invention to provide such a valve wherein the diaphragm is biased toward a valve-closed position without the use of a closing spring.

It is a further object of the invention to provide a diaphragm valve capable of extremely long life without the need for maintenance or repair.

It is another object of the invention to provide a diaphragm valve wherein the usual bleed hole in the diaphram, through which fluid at inlet pressure fills a chamber on the side of the diaphragm opposite the valve seat, is so located that the periphery of the bleed hole is supported by the valve body, thereby preventing stress of the diaphragm in the region of the bleed hole.

Additional objects and features of the invention will be apparent from the following description in which reference is made to the accompanying drawings.

Figure 1:
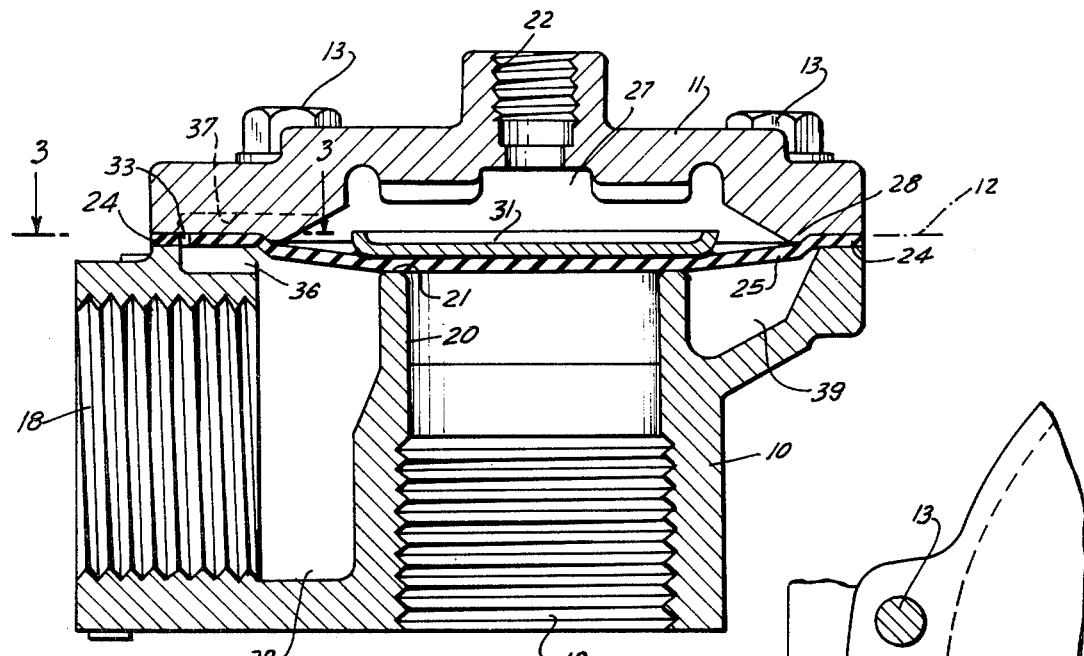
FIG. 1 is a vertical cross-sectional view of a springless diaphragm valve according to the present invention.

The valve chosen to illustrate the present invention includes a valve body formed in two parts, namely, a lower valve body portion 10 and an upper body portion, or bonnet, 11. The body portions 10 and 11 are separable along a horizontal plane of separation, indicated by the dot-dash line 12, and are joined together by bolts 13, two of which are shown in FIG. 1. Each bolt 13 passes through a hole 14 (FIG. 2) in upper body portion 11 and is threaded into a threaded bore 15 in lower body portion 10.

Figure 2:
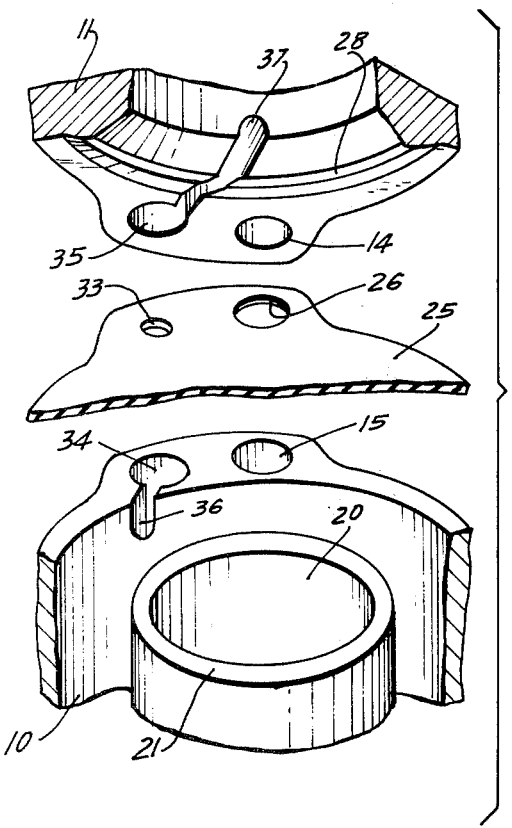
FIG. 2 is a fragmentary exploded view of the valve.
Figure 4:
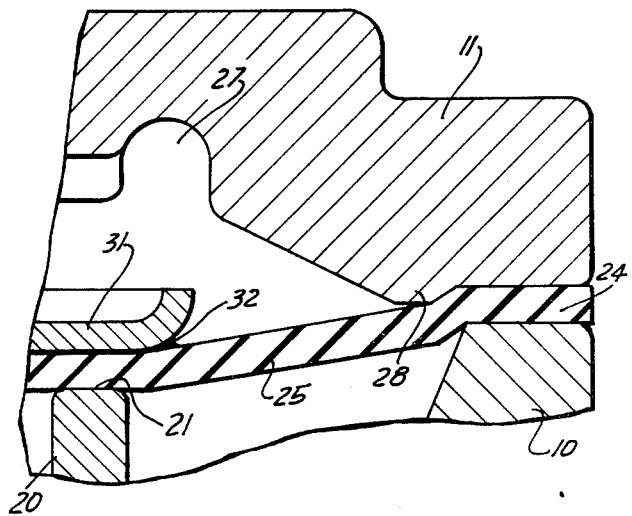
FIG. 4 is an enlarged view of a portion of FIG. 1.

Lower body portion 10 is formed with an internally threaded inlet port 18, for connection to a source of pressurized fluid (not shown), such as compressed air, and an internally threaded outlet port 19, for connection to a pulse recipient, such as a dust filter bag (not shown) requiring shaking. Between ports 18 and 19, body portion 10 has a valve orifice 20 surrounded by a valve seat 21 (FIGS. 1, 2, and 4). Upper body portion 11 is provided with an internally threaded pilot port 22 for connection, for example, to an electrically controlled valve (not shown) which either opens port 22 to the atmosphere, or some other low pressure region, or seals port 22 closed.

Extending horizontally across the interior of the valve is a flexible diaphragm 25, formed of any suitable material, preferably rubber. The margin 24 of diaphragm 25 is sandwiched between the peripheral edge portions of body portions 10 and 11. By this arrangement, the diaphragm is held in place, and the diaphragm margin serves as a resilient seal between the valve body portions 10 and 11. Diaphragm 25 is furnished with holes 26 (one being shown in FIG. 2) which register with holes 14 and bores 15 in the body portions and through which bolts 13 extend. A chamber 27 is defined within the valve body above diaphragm 25, the chamber being in communication with pilot port 22.

The central portion of diaphragm 25 can be flexed downwardly into the position shown in FIGS. 1 and 4, wherein it engages valve seat 21 and closes the valve by preventing fluid flow between inlet port 18 and outlet port 19. The central portion of the diaphragm can also be flexed upwardly away from valve seat 21 to open the valve and permit fluid flow from port 18 to port 19. Conventionally, a compression spring is located within chamber 27 to bias the diaphragm 25 toward valve seat 21. However, the valve of the present invention employs no such spring.

Instead, according to this invention, upper body portion 11 presents a downwardly projecting annular ridge 28 (FIGS. 1, 2, and 4) spaced radially outwardly from and surrounding valve seat 21. Ridge 28 projects below plane of separation 12 and hence deforms diaphragm 25 downwardly in an annular region just inside the margin 24 of the diaphragm which is gripped between the body portions. This deformation of the diaphragm biases it into engagement with valve seat 21, so that with equal pressures on both sides of the diaphragm, the valve will be closed.

To help prolong the life of the diaphragm, a backup washer 31 (FIG. 1 and 4) is applied to the face of the diaphragm opposite the face which engages valve seat 21. Washer 31 is fabricated from a rigid material, such as a suitable metal. By supporting the central portion of diaphragm 25 which engages valve seat 21 and covers orifice 20, backup washer prevents undue stress on the diaphragm. Conventionally, backup washer 31 is secured to diaphragm 25 by a mechanical fastener, such as a bolt and nut or a rivet, passing through aligned holes in the washer and diaphragm.

According to the present invention, a mechanical fastener is eliminated, and instead backup washer 31 is secured to diaphragm 25 by an adhesive 32. While any suitable adhesive, such as an epoxy, may be employed, the preferred adhesive is an elastomeric type sold by Hughson Chemical Company under the identification "Chemlok No. 234". Prior to application of the adhesive, both the metal washer and rubber diaphragm surfaces are cleaned, and "Chemlok No. 205" metal primer, also sold by Hughson, is sprayed or otherwise applied to the washer. The adhesive is then applied in any suitable fashion, such as by brushing, dipping, roller-coating, or spraying, to both surfaces to be joined. The adhesive dries to a tack-free film, after which the parts are pressed together. Chemlok No. 234 adhesive has a number of advantages as compared to other suitable adhesives, such as epoxy type adhesives. Among the advantages are excellent low temperature strength, dry non-tacky film at the point of assembly so that the parts pre-coated with adhesive can be easily handled, the bond is not sensitive to moisture, and the adhesive is non-toxic.

It is conventional to provide diaphragm 25 with a bleed hole through which high pressure fluid from inlet port 18 can flow to fill chamber 27 when the valve is to be closed. Usually, the bleed hole is provided in the region of the diaphragm between the margin which is squeezed between the body portions and the central portion which engages the valve seat. This presents a problem, since the diaphragm material surrounding the bleed hole tends to be stretched by fluid pressure, and ultimately tears, this requiring replacement of the diaphragm assembly.

Figure 3:
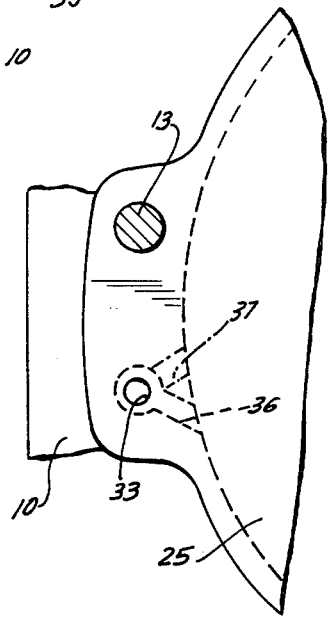
FIG. 3 is a fragmentary horizontal cross-sectional view taken on line 3—3 of FIG. 1.

According to this invention, a bleed hole 33 (FIGS. 1–3) is furnished in the margin of diaphragm 25 between upper and lower body portions 11 and 10. The surface of lower and upper body portions 10 and 11 which engage the diaphragm are formed with circular recesses 34 and 35, respectively, aligned with bleed hole 33. A channel 36 in body portion 10 establishes communication between inlet port 18 and bleed hole 33, and channel 37 in body portion 11 establishes communication between bleed hole 33 and chamber 27. As may be seen most clearly in FIG. 3, channels 36 and 37 are out of alignment, i.e., are arranged at an angle to each other, so that diaphragm 25 is supported by body portion 11 above channel 36, and by body portion 10 beneath channel 37. In addition, it will be seen that the diaphragm is supported by the valve body portions in the region surrounding bleed hole 33. As a result, tearing of the diaphragm due to stretching around the bleed hole is prevented.

When the valve is closed, as shown in FIGS. 1 and 4, and pilot port 22 is opened momentarily to the atmosphere or some other low pressure region, the high pressure fluid in chamber 27 is exhausted. As a result, the high pressure fluid in chamber 39 surrounding valve seat 21 lifts diaphragm 25 off the valve seat, thereby opening the valve and allowing a high volume pulse of fluid to flow from inlet port 18 to outlet port 19. Upon closing of pilot port 22, chamber 27 becomes filled with high pressure fluid flowing from inlet port 18 through channel 36, bleed hole 33, and channel 37, into chamber 27. The force on the upper surface of diaphragm 25, produced by the fluid pressure in chamber 27, quickly exceeds the force on the lower face of diaphragm 25, produced by the fluid pressure in chamber 39, and diaphragm 25 is therefore moved back into engagement with valve seat 21 to close the valve.

Elimination of a biasing spring above the diaphragm offers a number of advantages. First, there is one less part in the valve which can fail and require replacement. Second, diaphragm 25 can be lifted off valve seat 21 more quickly in response to opening of pilot port 22. Third, chamber 27 can be made smaller, since it need not include room for accommodating a spring. The smaller the chamber 27, the more quickly will the fluid pressure in it drop upon opening of pilot port 22 and hence the more rapidly the valve will open. Conversely, the smaller the chamber 27, the more quickly the fluid pressure will rise in it upon closing of pilot port 22, and hence the more rapidly the valve will close.

Furthermore, the lighter the diaphragm assembly 25, 31, the more rapidly it responds to opening and closing of pilot port 22. The diaphragm assembly of this invention is very light since it includes only the diaphgram 25, backup washer 31, and adhesive 32. Fastening means such as a nut and bolt or rivet, which add weight to the assembly, have been eliminated.

Thus, the present invention provides a valve capable of opening and closing very rapidly in response to control signals at pilot part 22, while at the same time being so constructed that it is capable of long life while in use, since there is no biasing spring which might fail and diaphragm 25 is rigidly supported at its points of stress.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A valve comprising:
   (a) a valve body having an inlet port, an outlet port, and a valve seat between said ports,
   (b) a flexible diaphragm within said valve body and movable into and out of engagement with said valve seat to close and open the valve, respectively, and
   (c) non-resilient, rigid means engaging said diaphragm only in a region radially outwardly of the region of said diaphragm which engages said valve seat for biasing said diaphragm into engagement with said valve seat, said rigid means being capable of fully closing the valve without the aid of any other closing force when the pressure is equal on both sides of said diaphragm.

2. A valve as defined in claim 1 wherein said means (c) for biasing said diaphragm is formed as part of said valve body.

3. A valve as defined in claim 1 wherein said means (c) for biasing said diaphragm is an annular ridge surrounding said valve seat, said ridge pressing said diaphragm toward said valve seat.

4. A valve as defined in claim 1 wherein said valve body comprises two portions joined together but separable along a plane of separation, the margin of said diaphragm being sandwiched between said two body portions, one of said body portions including said valve seat, and said means (c) for biasing said diaphragm being an annular ridge projecting from the other of said body portions across said plane of separation to the valve seat side of said plane.

5. A valve as defined in claim 1 including: (d) a rigid backup washer, an adhesive securing said washer to the face of said diaphragm opposite the face which engages said valve seat, said adhesive being the only means securing said washer to said diaphragm.

6. A valve as defined in claim 5 wherein said diaphragm is formed of rubber, said backup washer is formed of metal, and said adhesive is of the elastomeric type.

7. A valve as defined in claim 1 wherein said valve body comprises two portions joined together and includes a chamber on the side of said diaphragm opposite the side of said diaphragm which faces said inlet port and said valve seat, the margin of said diaphragm being sandwiched between said two body portions, a bleed hole in said diaphragm through which said inlet port communicates with said chamber, said bleed hole being in the margin of said diaphragm between said two body parts, wherebysaid body parts support the portion of said diaphragm immediately surrounding said bleed hole, and a channel in each of said body parts, one of said channels providing communication between said inlet port and said bleed hole, and the other of said channels providing communication between said bleed hole and said chamber.

8. A valve as defined in claim 7 wherein each of said channels extends longitudinally along the surface of its respective body part, so that the length of each channel is exposed when the body parts are separated, and said channels are out of alignment with each other.

9. A valve as defined in claim 1 wherein said non-resilient rigid means engages the face of said diaphragm opposite the face which engages said valve seat, the face of said diaphragm which engages said valve seat being unsupported in the region in which said non-resilient, rigid means engages said diaphragm.

* * * * *